(12) United States Patent
Phillips

(10) Patent No.: US 8,043,190 B2
(45) Date of Patent: Oct. 25, 2011

(54) MULTI-SPEED TRANSMISSION WITH STACKED PLANETARY GEAR SETS

(75) Inventor: Andrew W. Phillips, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 473 days.

(21) Appl. No.: 12/362,186

(22) Filed: Jan. 29, 2009

(65) Prior Publication Data

US 2010/0190601 A1 Jul. 29, 2010

(51) Int. Cl.
*F16H 3/62* (2006.01)
(52) U.S. Cl. .......................................... 475/276; 475/903
(58) Field of Classification Search ........................ None
See application file for complete search history.

(56) References Cited

U.S. PATENT DOCUMENTS

| | | | | |
|---|---|---|---|---|
| 2,478,869 A | * | 8/1949 | Hasbany | 475/284 |
| 4,229,996 A | * | 10/1980 | Hildebrand | 475/55 |
| 5,429,557 A | * | 7/1995 | Beim | 475/283 |
| 5,919,111 A | * | 7/1999 | Park | 475/269 |
| 5,993,347 A | * | 11/1999 | Park | 475/280 |
| 6,652,409 B2 | | 11/2003 | Kao et al. | |
| 6,679,802 B2 | | 1/2004 | Raghavan et al. | |
| 2009/0005209 A1 | * | 1/2009 | Phillips | 475/296 |

* cited by examiner

*Primary Examiner* — Dirk Wright

(74) *Attorney, Agent, or Firm* — Quinn Law Group, PLLC

(57) ABSTRACT

A multi-speed transmission is provided that has three planetary gear sets that have a plurality of members positioned to establish only two gear planes. Six torque-transmitting mechanisms are selectively engagable in different combinations to connect different members of the planetary gear sets with an input member, an output member, a stationary member, and one another to establish seven forward speed ratios and a reverse speed ratio. One of the gear planes is established by the first and the second planetary gear sets. The second planetary gear set is positioned concentric with and radially-outward of the first planetary gear set, and the first and second planetary gear sets share a member.

18 Claims, 2 Drawing Sheets

| Gear State | 50 | 52 | 54 | 56 | 58 | 59 |
|---|---|---|---|---|---|---|
| Rev | X | | X | | | |
| N | | | | | | |
| 1st | | | X | | | X |
| 2nd | | X | | | | X |
| 3rd | X | | | | | X |
| 4th | | | | | X | X |
| 5th | X | | | | X | |
| 6th | | X | | | X | |
| 7th | | | | X | X | |

X = Engaged

MULTI-SPEED TRANSMISSION WITH STACKED PLANETARY GEAR SETS

TECHNICAL FIELD

The invention relates to a multi-speed transmission.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration. The development of multi-speed transmissions, such as seven-speed and beyond, has been somewhat precluded because of complexity, size and cost of the additional components often necessary to achieve the additional speed ratios.

SUMMARY OF THE INVENTION

A multi-speed transmission is provided that has three planetary gear sets that have a plurality of members positioned to establish only two gear planes. Six torque-transmitting mechanisms are selectively engagable in different combinations to connect different members of the planetary gear sets with an input member, an output member, a stationary member, and one another to establish seven forward speed ratios and a reverse speed ratio. One of the gear planes is established by the first and the second planetary gear sets. The second planetary gear set is positioned concentric with and radially-outward of the first planetary gear set, and the first and second planetary gear sets share a member, which may serve as the ring gear member of the first planetary gear set and the sun gear member of the second planetary gear set.

A first interconnecting member may be used to continuously connect a carrier member of the first planetary gear set with a carrier member of the second planetary gear set. A second interconnecting member may be used to continuously connect a ring gear member of the second planetary gear set for common rotation with a sun gear member of the third planetary gear set.

The input member may be concentric with the output member, creating a seven-speed transmission of relatively short axial length such as may be necessary for packaging in a front wheel-drive arrangement. Alternatively, the first and second planetary gear sets may be concentric with the input member in a rear-wheel drive arrangement.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
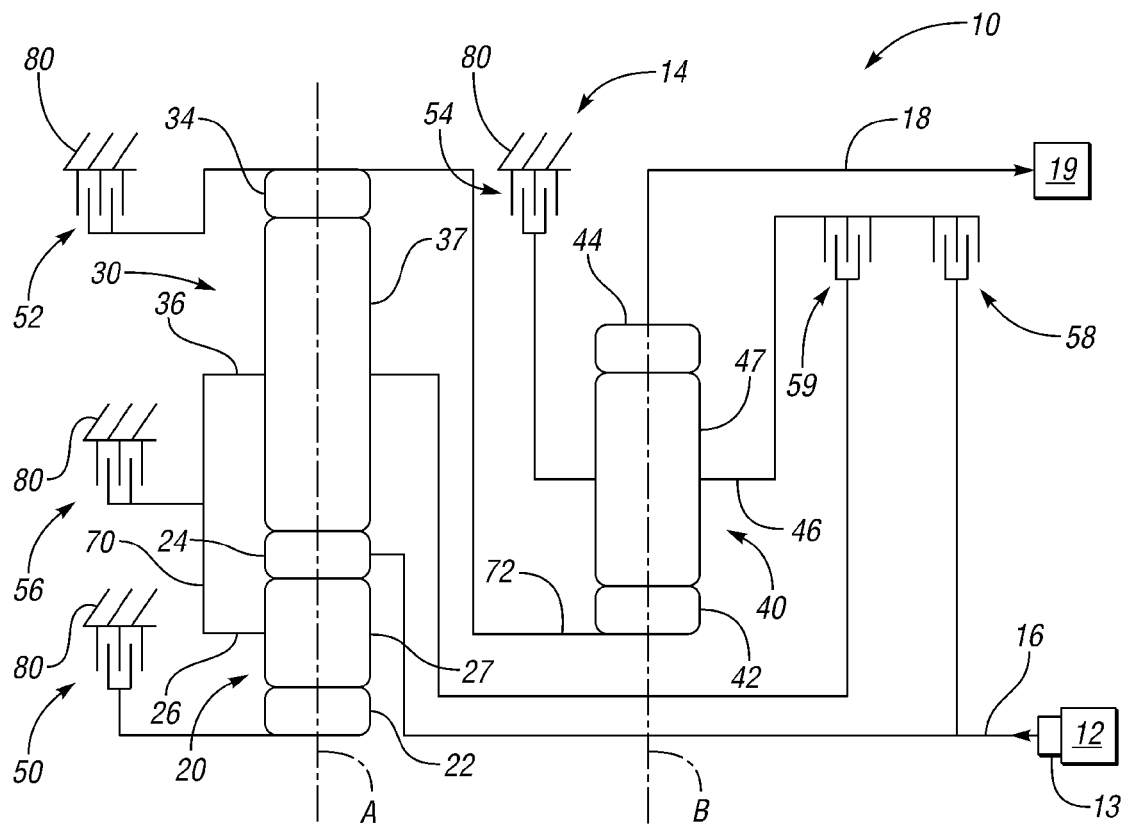
FIG. 1 is a schematic illustration of a first embodiment of a seven-speed transmission.
FIG. 2 is a truth table indicating some of the operating characteristics of the transmission of FIG. 1.

Referring to the drawings, wherein like reference numbers refer to like components throughout the several views, FIG. 1 shows a powertrain 10 having an engine 12 and torque converter 13 operatively connected to a multi-speed transmission 14. The multi-speed transmission 14 includes an input member 16 continuously connected for rotation with an output member of the engine 12 and torque converter 13, and an output member 18 continuously connected with a final drive mechanism 19 leading to the wheels of a vehicle to provide tractive force to the vehicle. Those skilled in the art will recognize the arrangement of the output member 18 being concentric with the input member as indicative of a front wheel-drive transmission.

The multi-speed transmission 14 includes a planetary gear arrangement with a first planetary gear set 20, a second planetary gear set 30 and a third planetary gear set 40. The first and second planetary gear sets 20, 30 are radially stacked, with the second planetary gear set 30 being radially outward of the first planetary gear set 20 so that the gear sets 20, 30 define a first gear plane A, with the plane A intersecting all of the members of the gear sets 20, 30 perpendicular to the axes of rotation of the members of the gear sets 20, 30.

The first planetary gear set gear set 20 shares a first member 24 with the second gear set 30. The first member 24 is the ring gear member of the first planetary gear set 20 and the sun gear member of the second planetary gear set 30. The first planetary gear set 20 also has a sun gear member 22, a carrier member 26 and a plurality of pinion gears 27 that are supported by the carrier member 26 and mesh with both the sun gear member 22 and the ring gear member (first member) 24.

The second planetary gear set 30 includes the first member 24 serving as a sun gear member, a ring gear member 34, and a carrier member 36 that rotatably supports a plurality of pinion gears 37 that mesh with both the first member 24 and the ring gear member 34. Thus, the first member 24 has two sets of teeth, with a radially inner set of teeth meshing with the pinion gears 27 and a radially outer set of teeth meshing with the pinion gears 37, as will be understood by those skilled in the art.

The planetary gear set 40 is axially spaced from the stacked first and second planetary gear sets 20, 30, and includes a sun gear member 42, a ring gear member 44, and a carrier member 46 that rotatably supports a plurality of pinion gears 47 that mesh with both the sun gear member 42 and the ring gear member 44. The members of the planetary gear set 40 are aligned to define a second gear plane B, with the plane B intersecting all of the members of the gear set 40 perpendicular to the axes of rotation of the members of the gear set 40.

A first interconnecting member 70, which may be referred to as a rotatable hub member, continuously connects the carrier members 26, 36 for common rotation with one another. A second interconnecting member 72, which may also be referred to as a rotatable hub member, continuously connects the ring gear member 34 for common rotation with the sun gear member 42. As used herein, two members that are connected for common rotation rotate at the same speed.

The transmission includes six selectively engagable torque-transmitting mechanisms that are preferably hydraulically-actuated friction clutches and brakes. A first torque-transmitting mechanism 50 is stationary clutch (i.e., a brake) that is selectively engagable to ground the sun gear member 22 to a stationary member 80, such as a transmission housing. A second torque-transmitting mechanism 52 is a stationary clutch that is selectively engagable to ground the ring gear member 34 to the stationary member 80. A third torque-transmitting mechanism 54 is a stationary clutch that is selectively engagable to ground the carrier member 46 to the stationary member 80. A fourth torque-transmitting mechanism 56 is a stationary clutch that is selectively engagable to ground the interconnected carrier members 26, 36 to the stationary member 80. A fifth torque-transmitting mechanism 58 is a rotating-type clutch that is selectively engagable to connect the first member 24 for common rotation with the carrier member 46. A sixth torque-transmitting mechanism 59 is a rotating-type clutch that is selectively engagable to connect the carrier member 36 (and the carrier member 26 via the first interconnecting member 70) for common rotation with the carrier member 46.

Referring to FIG. 2, the torque-transmitting mechanisms 50, 52, 54, 56, 58, and 59 are selectively engagable in combinations of two as shown to establish seven forward speed ratios and a reverse speed ratio, corresponding with the reverse gear state and seven forward gear states indicated. Torque-transmitting mechanisms 50 and 54 are engaged to establish the reverse speed ratio. Torque-transmitting mechanisms 54 and 59 are engaged to establish the first forward speed ratio. Torque-transmitting mechanisms 52 and 59 are engaged to establish the second forward speed ratio. Torque-transmitting mechanisms 50 and 59 are engaged to establish the third forward speed ratio. Torque-transmitting mechanisms 58 and 59 are engaged to establish the fourth forward speed ratio. Torque-transmitting mechanisms 50 and 58 are engaged to establish the fifth forward speed ratio. Torque-transmitting mechanisms 52 and 58 are engaged to establish the sixth forward speed ratio. Torque-transmitting mechanisms 56 and 58 are engaged to establish the seventh forward speed ratio. Thus, shifts between subsequent speed ratios are single transition shifts (i.e., only one torque-transmitting mechanism is disengaged while another is engaged to establish the subsequent speed ratio, with a third torque-transmitting mechanism remaining engaged in both speed ratios). Skip shifts (i.e., shifts from the first forward speed ratio to the third forward speed ratios, etc.) are also single transition shifts.

By stacking the planetary gear sets 20, 30 to define a single gear plane A, which is accomplished by sharing gear member 24 between the gear sets 20, 30, a seven-speed transmission 14 is provided that has only two gear planes A, B, and thus is axially compact, which is especially important for packaging purposes in a front wheel-drive arrangement.

The transmission 14 provides an overall gear ratio of 7.02, assuming the following tooth ratios for the ring gear members to the sun gear members of the respective gear sets: the ratio of the number of teeth of first gear member 24 to the number of teeth of sun gear member 22 is 2.06; the ratio of the number of teeth of the ring gear member 34 to the first gear member 24 is 2.37; and the ratio of the number of teeth of the ring gear member 44 to the number of teeth of the sun gear member 42 is 1.54. With these tooth ratios, the following speed ratios between the input member 16 and the output member 18 are provided (i.e. the speed of the input member 16 to the speed of the output member 18): reverse speed ratio is −2.881; the first forward speed ratio is 3.649; the second forward speed ratio is 2.043; the third forward speed ratio is 1.312; the fourth forward speed ratio is 1.000; the fifth forward speed ratio is 0.768; the sixth forward speed ratio is 0.606; and the seventh forward speed ratio is 0.520.

Figure 3:
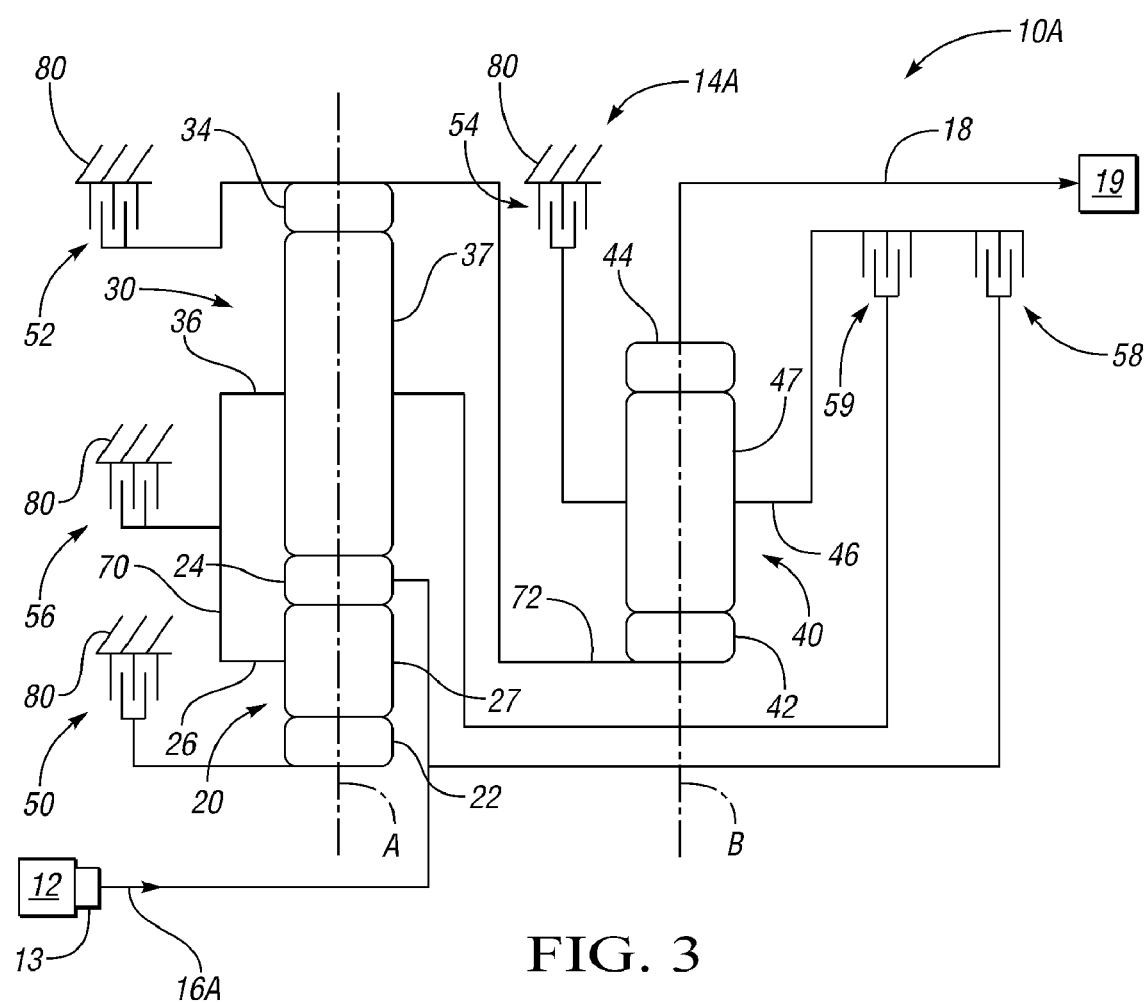
FIG. 3 is a schematic illustration of a second embodiment of a seven-speed transmission that is also operated according to the truth table of FIG. 2.

Referring to FIG. 3, a second embodiment of a powertrain 10A is shown that is alike in all respects to the powertrain 10 of FIG. 1, except that it includes a transmission 14A has an input member 16A that is concentric with and radially inward of the first and second planetary gear sets 20, 30. Thus, the final drive mechanism 19 is spaced longitudinally on a vehicle from the engine 12, with the planetary gear sets 20, 30, 40 of the transmission 14A therebetween, in a rear wheel-drive arrangement. All other components of the powertrain 10A are identical in function and configuration with those of powertrain 10, and are referred to by identical reference numbers. Thus, the powertrain 10A is operable according to the truth table of FIG. 2 to provide the reverse speed ratio and seven forward speed ratios indicated.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
   an input member;
   an output member;
   a stationary member;
   three planetary gear sets having a plurality of members positioned to establish only two gear planes; and
   six torque-transmitting mechanisms selectively engagable in different combinations to connect different members of the planetary gear sets with the input member, the output member, the stationary member, and one another to establish seven forward speed ratios and a reverse speed ratio.

2. The multi-speed transmission of claim 1, wherein a first and a second of the three planetary gear sets are radially stacked, with the second planetary gear set being radially outward of the first planetary gear set to establish a first of the two gear planes; wherein a first of the plurality of members is shared as a ring gear member of the first planetary gear set and a sun gear member of the second planetary gear set.

3. The multi-speed transmission of claim 2, wherein the plurality of members include a ring gear member of the second planetary gear set, a sun gear member of the third planetary gear set, a carrier member of the first planetary gear set, and a carrier member of the second planetary gear set; and further comprising:
   a first interconnecting member continuously connecting the carrier member of the first planetary gear set with the carrier member of the second planetary gear set; and
   a second interconnecting member continuously connecting the ring gear member of the second planetary gear set for common rotation with the sun gear member of the third planetary gear set.

4. The multi-speed transmission of claim 3, wherein the plurality of members include a ring gear member of the third planetary gear set; wherein the input member is continuously connected for common rotation with the first of the plurality of members; and wherein the output member is continuously connected for common rotation with the ring gear member of the third planetary gear set.

5. The multi-speed transmission of claim 1, wherein the output member is concentric with the input member and the transmission is a front wheel-drive transmission.

6. A multi-speed transmission comprising:
an input member;
an output member;
a first, a second, and a third planetary gear set; wherein the first and second planetary gear sets are radially stacked with respect to one another with a first member common to both; and
six torque-transmitting mechanisms selectively engagable in different combinations to establish seven forward speed ratios and a reverse speed ratio.

7. The multi-speed transmission of claim 6, wherein the first member common to both the first and the second planetary gear sets is a ring gear member of the first planetary gear set and a sun gear member of the second planetary gear set.

8. The multi-speed transmission of claim 6, further comprising:
a first interconnecting member continuously connecting a second member of the first planetary gear set for common rotation with a second member of the second planetary gear set.

9. The multi-speed transmission of claim 6, further comprising:
a second interconnecting member continuously connecting a third member of the second planetary gear set for common rotation with a member of the third planetary gear set.

10. The multi-speed transmission of claim 6, wherein the input member is continuously connected for common rotation with the first member of the first and second planetary gear sets; and wherein the output member is continuously connected for common rotation with the first member of the third planetary gear set.

11. The multi-speed transmission of claim 6, further comprising:
a stationary member; and wherein one of the six torque-transmitting mechanisms is selectively engagable to ground a third member of the first planetary gear set to the stationary member.

12. The multi-speed transmission of claim 6, further comprising:
a stationary member; and wherein one of the six torque-transmitting mechanisms is selectively engagable to ground a third member of the second planetary gear set to the stationary member.

13. The multi-speed transmission of claim 6, further comprising:
a stationary member; and wherein one of the six torque-transmitting mechanisms is selectively engagable to ground a third member of the third planetary gear set to the stationary member.

14. The multi-speed transmission of claim 6, further comprising:
a stationary member; and wherein one of the six torque-transmitting mechanisms is selectively engagable to ground a second member of the first planetary gear set and a second member of the second planetary gear set to the stationary member.

15. The multi-speed transmission of claim 6, wherein one of the six torque-transmitting mechanisms is selectively engagable to connect a third member of the third planetary gear set for common rotation with the first member of the first and second planetary gear sets.

16. The multi-speed transmission of claim 6, wherein one of the six torque-transmitting mechanisms is selectively engagable to connect a second member of the second planetary gear set for common rotation with a third member of the third planetary gear set.

17. The multi-speed transmission of claim 6, wherein the output member is concentric with the input member and the transmission is a front wheel-drive transmission.

18. The multi-speed transmission of claim 6, wherein the first and second planetary gear sets and concentric with the input member and the transmission is a rear wheel-drive transmission.

* * * * *